(12) United States Patent
Wallace et al.

(10) Patent No.: US 7,113,984 B1
(45) Date of Patent: Sep. 26, 2006

(54) APPLICATIONS FOR NETWORKED STORAGE SYSTEMS

(75) Inventors: R. Bruce Wallace, Ashton (CA); Bruce L. Townsend, Stittsville (CA); Thomas P. Chmara, Richmond (CA); Ryan Stark, Ottawa (CA); John H. Bell, Ottawa (CA)

(73) Assignee: Nortel Networks Limited, (CA)

( * ) Notice: Subject to any disclaimer, the term of this patent is extended or adjusted under 35 U.S.C. 154(b) by 567 days.

(21) Appl. No.: 09/624,051

(22) Filed: Jul. 24, 2000

Related U.S. Application Data

(60) Provisional application No. 60/208,472, filed on Jun. 2, 2000.

(51) Int. Cl.
 *G06F 15/177* (2006.01)
 *G06F 15/16* (2006.01)

(52) U.S. Cl. ...................................... 709/220; 370/466
(58) Field of Classification Search ................ 709/212, 709/213, 217, 220, 230; 370/399, 466
 See application file for complete search history.

(56) References Cited

U.S. PATENT DOCUMENTS

| | | | | |
|---|---|---|---|---|
| 5,805,805 A * | 9/1998 | Civanlar et al. | ............ | 709/220 |
| 5,959,994 A * | 9/1999 | Boggs et al. | ................ | 370/399 |
| 5,996,024 A * | 11/1999 | Blumenau | .................... | 719/326 |
| 6,314,477 B1 * | 11/2001 | Cowger et al. | ................ | 710/22 |
| 6,400,730 B1 * | 6/2002 | Latif et al. | ................... | 370/466 |
| 6,430,602 B1 * | 8/2002 | Kay et al. | .................... | 709/206 |
| 6,470,382 B1 * | 10/2002 | Wang et al. | ................ | 709/220 |
| 6,601,101 B1 * | 7/2003 | Lee et al. | .................... | 709/227 |
| 6,658,459 B1 * | 12/2003 | Kwan et al. | ................ | 709/217 |
| 6,675,200 B1 * | 1/2004 | Cheriton et al. | ............ | 709/212 |
| 6,684,270 B1 * | 1/2004 | Chmara et al. | ................ | 710/38 |
| 6,738,821 B1 * | 5/2004 | Wilson | ........................ | 709/230 |
| 6,834,326 B1 * | 12/2004 | Wang et al. | ................ | 711/114 |

OTHER PUBLICATIONS

Nagle, D., Active Storage Networks, www.ece.cmu.edu/~asn/old/pubs/Active%20Storage%20Nets%20Intro.pdf, Carnegie Mellon Univ., pp. 1-14, Jul. 16, 1998.*

(Continued)

*Primary Examiner*—Larry D. Donaghue
(74) *Attorney, Agent, or Firm*—McGuinness & Manaras LLP

(57) ABSTRACT

At least one network device that moves storage blocks based upon a session layer or higher protocol set is employed to facilitate communication between at least one host and at least one target storage device. The at least one network device may include a server and a switch. Transactions related to data storage access are expressed in a non-network protocol and transmitted via a network protocol data unit across at least a portion of the network by employing encapsulation. An adapter card associated with the data storage unit is employed to extract the non-network protocol transaction. Multiple, mirrored data storage units that are separated by relatively large physical distance may be employed to reduce the likelihood of catastrophic data loss due to an event such as a fire. Further, READ transactions may be facilitated by preloading data storage units with READ metadata for subsequent transmission to a client device to enable expedited access to data stored on the data storage units.

16 Claims, 2 Drawing Sheets

OTHER PUBLICATIONS

Pfleeger, C., Security in Computing, 2nd ed., Prentice-Hall PTR, pp. 286-292, 1997.*

Kumar, A., The Fibre Channel Versus Ethernet Debate: How Many Angels Can Dance On The Head Of A Pin?, Brocade Communications Systems, Inc., pp. 1-6, Apr. 3, 2000.*

What is SCSI?, www.uni-mainz.de/~neuffer/scsi/what_is_scsi.html, pp. 1-5, May 4, 2004.*

IP Storage BOF, www.cs-ipv6.lancs.ac.uk/ipv6/documents/standards/general-comms/ietf/00mar/ips-agenda.txt, pp. 1-2, Mar. 29, 2000.*

Gibson et al. A Cost-Effective, High-Bandwidth Storage Architecture, pp. 1-12, 1998 ACM.*

* cited by examiner

APPLICATIONS FOR NETWORKED STORAGE SYSTEMS

CROSS-REFERENCE TO RELATED APPLICATIONS

A claim of priority is made to U.S. Provisional Patent Application Ser. No. 60/208,472, entitled Data Access in a Network Environment, filed on Jun. 2, 2000.

FIELD OF THE INVENTION

The present invention is generally related to network communications, and more particularly to applications for networked storage systems.

BACKGROUND OF THE INVENTION

Techniques that enable multiple computers to access multiple data storage devices in a network are known. For example, personal computers may access a Redundant Array of Independent Disks (RAID) through a server. The personal computers may communicate with the server via a Local Area Network (LAN) employing Ethernet, Token Ring or FDDI, while the server communicates with the storage devices associated with the RAID in accordance with a non-network protocol such as Small Computer System Interface (SCSI). However, such known configurations have limitations. For example, the number of data storage devices that can be addressed via each SCSI interface is limited to only 4, 8 or 16, depending on the version of SCSI that is implemented. Further, the physical characteristics of the SCSI cabling that connects the data storage devices to the server impose limitations on the geographic placement of the data storage devices. In particular, the server and the data storage devices must be located in relatively close physical proximity because the maximum practical length of the SCSI cabling is relatively short. Such proximity results in vulnerability to catastrophic data loss due to events such as fire. While techniques for communicating SCSI transmissions over larger distances via Internet Protocol (IP) and Fiber Channel (FC) have been proposed, some of the problems remain.

SUMMARY OF THE INVENTION

In accordance with the present invention, at least one network device that moves storage blocks based upon a session layer (Open Systems Interconnection ("OSI") Layer 5) or higher protocol set is employed to facilitate communication associated with storage between at least one host and at least one target storage device. The network device may be a switch. Further, the switch may be situated within the network, rather than at the network edge. Transactions related to data storage access may be expressed in a non-network protocol and transmitted via a network protocol data unit across at least a portion of the network by employing techniques such as encapsulation.

The present invention enables network data storage implementations with enhanced performance and reduced likelihood of catastrophic data loss. Performance is enhanced because a relatively large number of data storage devices may be addressed, thereby enabling N-way striping and mirroring. The likelihood of catastrophic data loss is reduced because the physical distance between individual data storage devices can be increased. For example, data stored in a first data storage device may be mirrored by a second data storage device that is located at a sufficiently great physical distance from the first data storage device to mitigate the possibility of contemporaneous destruction of both data storage devices by an event such as a fire. Flexibility in the choice of physical location for data storage devices combined with N-way mirroring enables load balancing and storage of selected data on a faster communication path relative to selected network devices, such as devices that most frequently access the data, without precluding data access by other network devices. Further, network scalability is facilitated by simplifying network connections. Hence, many devices may share a file store and data storage devices may be easily added to the network.

In another embodiment of the present invention, a READ operation is facilitated by transmitting READ metadata to the filesystem associated with the client. The READ metadata describes a procedure for accessing data stored on at least one networked storage device, and may be maintained by a filesystem associated with a content owner device. When a client transmits a READ transaction to the networked storage device, READ metadata is transmitted from the networked storage device to the client device. The transmitted READ metadata is selected to be sufficient to enable the client device to obtain the data associated with the READ operation from the networked storage device without communication with the content owner device. The client employs the metadata with a "read only" read utility to obtain the data. Since a "local copy" of the metadata is employed and the content owner device is not included in the read transaction, performance is improved. The content owner device may issue an update by providing new metadata to the networked storage device.

BRIEF DESCRIPTION OF THE DRAWING

The invention will be more fully understood from the following Detailed Description and Drawing, of which.

DETAILED DESCRIPTION

Figure 1:
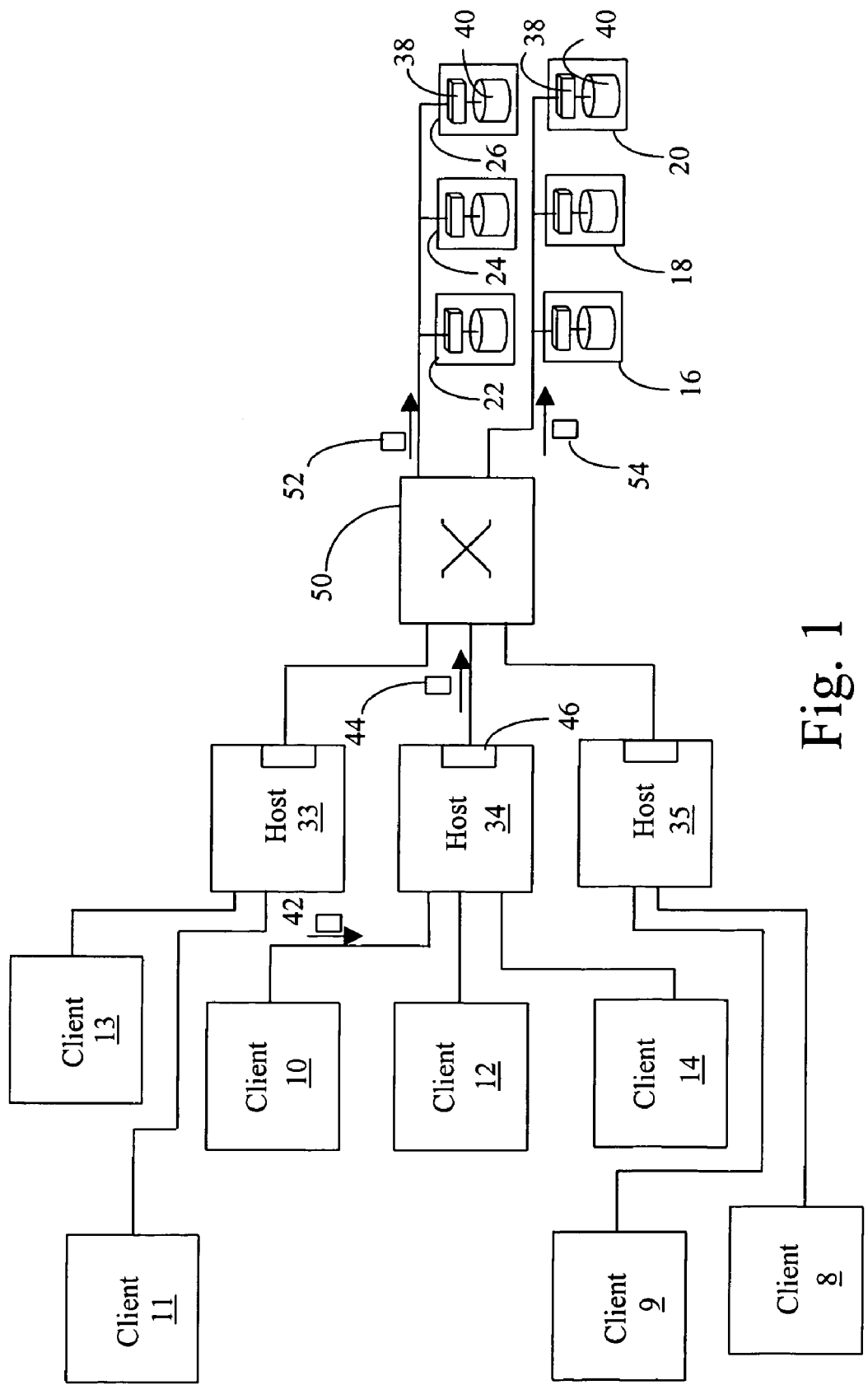
FIG. 1 is a block diagram of a portion of a network that illustrates use of a storage services protocol set to facilitate network storage.

FIG. 1 is a block diagram of a portion of a network. Client devices 8, 9, 10, 11, 12, 13, 14 are connected with a plurality of data storage units 16, 18, 20, 22, 24, 26 via hosts 33, 34, 35 and a switch 50 capable of moving storage blocks based upon a session layer or higher ("storage services") protocol set. Each device in the network is associated with a network address, such as an Internet Protocol (IP) address. Each data storage unit includes an interface adapter 38 and at least one physical storage device 40 such as a disk.

The storage services protocol set is employed to facilitate transmission of data units associated with storage operations between the clients and the data storage units. Transactions between the clients and the hosts may be represented in network protocol data units 42, such as packets, frames or cells. In the illustrated embodiment, communication of transactions between the clients and the hosts is in accordance with Transport Control Protocol (TCP) or Unacknowledged Datagram Protocol (UDP) over IP over Ethernet. Corresponding communications between the hosts, switch 50 and data storage units 16–26 employ modified representations of the network protocol data units wherein SCSI, IDE or similar command sets are employed by the storage services protocol set. In particular, corresponding non-network protocol transactions are generated and encapsulated in network protocol data units 44 to provide, for example, SCSI or IDE over TCP or UDP over IP over Ethernet. Those skilled in the art will recognize that other protocols may be utilized.

The hosts employ metadata to generate the encapsulating data units. For example, in a READ operation initiated by the client 10, a representation of at least one block or file to be retrieved is transmitted from the client to the host 34 via data unit 42. Following receipt of the data unit 42, the host 34 determines where data that corresponds to the READ operation is located at the storage devices by employing metadata that is maintained on a filesystem 46 associated with the host 34. The metadata describes the directory hierarchy, file attributes, permissions, and file layout in terms of a block address chain. The host may first employ the metadata to determine whether to allow the client access to the data. Techniques for determining whether to allow access are well known in the art. If access to the data is to be allowed, the host employs the metadata to generate a corresponding non-network protocol READ transaction that is encapsulated in at least one network protocol data unit 44. For example, a SCSI transaction and a header portion may be generated and combined to form the new protocol data unit 44, where the SCSI transaction is placed in the payload portion of the data unit. The new network protocol data unit 44 is then transmitted to the switch 50, which directs the data unit 44 to the appropriate data storage unit 26 based on predetermined criteria, such as IP destination address and storage services protocol set information.

The data storage units operate upon the encapsulated transactions following receipt thereof. For example, the READ transaction is executed by retrieving the data that is specified by the encapsulated SCSI transaction and returning that data to the host 34. Following receipt of the network protocol data unit 44 by the designated data storage unit 26, the encapsulated transaction is extracted from the data unit. In particular, the interface adapter 38 associated with the data storage unit 26 is employed to strip the header portion of the data unit from the payload portion. The IP source address and other information from the header portion may be retained to facilitate transmission of data from the data storage unit to the host. The remaining non-network protocol transaction is employed to retrieve data in accordance with techniques known in the art. The interface adapter 38 is employed to encapsulate the retrieved data in at least one network protocol data unit 46 that designates the IP address of the host in the destination field. The network protocol data unit 44 is transmitted to the host 34 via the switch 50 based on predetermined criteria, such as IP destination address and storage services protocol set information. Following receipt of the data unit 44 that contains the data, the host generates at least one corresponding network protocol data unit 48 that indicates the IP address of the client in the destination address field. The client 10 extracts the data from the data unit 48.

The predetermined criteria for directing the data units may include employing the storage services protocol set at the switch or elsewhere to facilitate implementation of the data storage units as a Redundant Array of Independent Disks (RAID). If data is mirrored, striped or otherwise located on a plurality of the data storage units, the data units associated with the transactions are replicated at the switch based on storage services protocol set information. Reliable unicast or reliable multicast may be employed by the switch to transmit the data units between the hosts to the data storage units.

The storage services protocol set may also be employed to enhance performance by balancing the data access load and testing for data integrity. In the case of a READ operation where mirroring is implemented, load data may be employed by the switch to determine the data access load on each data storage unit, and to balance the load on the data storage units by transmitting the data unit associated with the transaction only to a selected data storage unit with relatively less load. Alternatively, the data unit may be transmitted to each mirrored data storage unit in order to obtain data from the fastest responding mirrored data storage unit. Alternatively, data returned from a plurality of mirrored data storage units may be compared by the switch to provide greater assurance of data integrity.

In order to provide protection against catastrophic data loss, the mirrored data storage units may be separated by relatively large physical distances. In mirroring, multiple identical copies of data are maintained on multiple disks, typically one copy per disk where each data storage unit includes at least one disk. The disks associated with mirrored pairs are separated by a sufficiently large distance to protect against contemporaneous destruction by a catastrophic event such as fire. Further, performance may be enhanced by implementing an N-way mirrored RAID, where N is limited only by the number of available IP addresses. Individual mirrored disks associated with the N-way mirrored RAID are disposed along a respective fast communication path relative to areas of greater network activity. For example, a mirrored disk may be located near each one of a group of urban areas.

Figure 2:
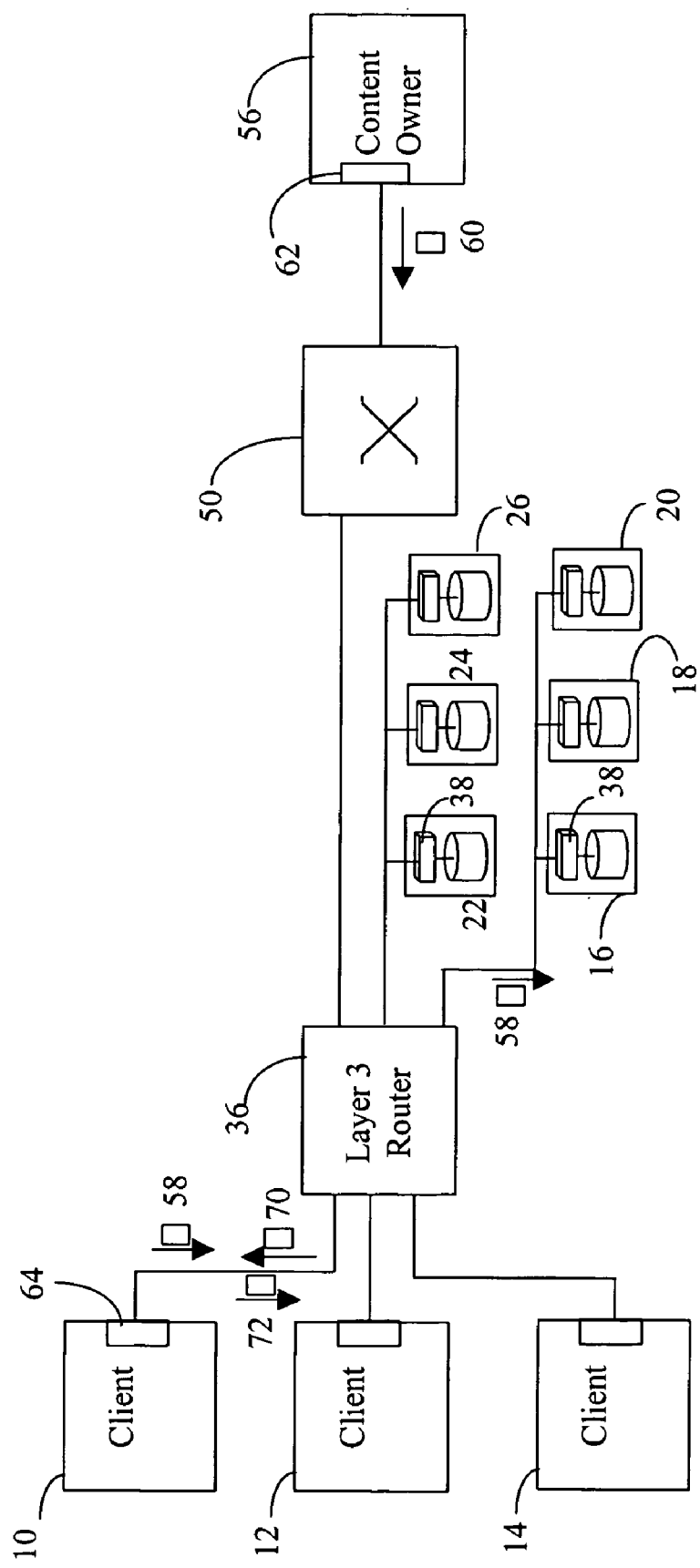
FIG. 2 is a block diagram of a portion of a network that illustrates a READ operation in a network where the data is owned by a content owner device.

Referring now to FIG. 2, data access may also be enhanced by providing metadata to the clients. In the illustrated network portion, hosts are not employed and data ownership is asserted by a content owner device 56. The content owner 56 retains control of READ and WRITE privileges for at least some of the data stored in the data storage units 16–26. However, metadata from filesystem 62 is provided to the data storage units by the content owner device via at least one data unit 60. To obtain owned data, the client 10 initially transmits a READ transaction to at least one of the data storage units. The READ transaction employs at least one network protocol data unit 58 that designates at least one file or block of data that is to be transmitted to the client. The data unit 58 is transmitted from the client to the Layer 3 router 36, and from the Layer 3 router to the designated data storage units. The receiving data storage units process the READ transaction to determine whether to grant the client access to the data. Techniques for determining whether to allow access are well known in the art. If access to the data is to be allowed, the data storage unit selects READ metadata that describes the location of the data associated with the READ transaction in terms of a block address chain. The selected READ metadata is transmitted from the data storage unit to the client via the Layer 3 router in at least one network protocol data unit 70.

The transmitted READ metadata is employed by the filesystem 64 of the client 10 to directly access the associated data from the data storage units. A new READ transaction is generated by the client and transmitted to the data storage units via at least one network protocol data unit 72. In particular, a non-network protocol READ transaction is placed in a payload portion of at least one protocol data unit, and a header portion is generated for the protocol data unit. The header portion of the protocol data unit 72 includes a source address field that contains the IP source address that is associated with the client 10, and a destination address field that contains the IP destination address that is associated with the appropriate data storage unit 22. The data unit is then transmitted to the Layer 3 router, which routes the data unit to the data storage unit designated by the IP destination address. Following receipt of the network protocol data unit by the data storage unit, the encapsulated non-network protocol READ transaction is extracted from the data unit 72. In particular, the interface adapter 38 associated with the data storage unit 22 is employed to strip the header portion of the data unit from the payload. The IP source address and other information from the header portion may be retained to facilitate transmission of data from the data storage unit to the client. The READ transaction is executed by retrieving the data that is specified by the READ transaction and returning that data to the client. As described above, the interface adapter is employed to place the retrieved data in at least one network protocol data unit that designates the IP address of the client in the destination field. The network protocol data units are then transmitted to the client via the Layer 3 router. A host could alternatively be employed to mitigate the client's computational overhead associated with encapsulating non-network protocol transactions. The content owner device transmits updated metadata to the data storage units when the storage content changes.

The described technique is compatible with RAID implementations and mirrored sites in an Internet environment. In the case of a READ operation where mirroring is implemented, the READ metadata that is transmitted from the content owner device to the data storage units and from the data storage units to the client may each be selected to achieve one or more performance objectives. For example, load data may be employed to determine the data access load on each data storage unit, and balance the load on the data storage units by transmitting READ metadata that corresponds to a selected data storage unit with relatively less load. Alternatively, READ metadata corresponding to a data storage unit that is located along a relatively faster communication path to the client relative to other data storage units may be transmitted to the client. The READ metadata may alternatively correspond to a plurality of data storage units in order to obtain data from the fastest responding data storage unit.

Variations, modifications and different applications of the invention taught in the Detailed Description and Drawing will be apparent to those skilled in the art. For example, it will be understood by those skilled in the art that the described storage services protocol set based processing functions may be performed by a device other than the illustrated switch. Accordingly, it should be understood that other embodiments of the invention might be practiced without departing from the spirit and scope of the invention as defined by the appended claims.

What is claimed is:

1. A method for facilitating operations related to data storage between a first device and at least one data storage unit in a computer network, comprising the steps of:
   duplicating selected metadata from the at least one data storage unit to the first device, wherein the selected metadata describes a location of data stored on the data storage unit;
   causing generation of a storage services protocol transaction to access the data stored on the data storage unit and described by the selected metadata, wherein the generation is responsive to the selected metadata duplicated to the first device;
   encapsulating the storage services protocol transaction into a payload portion of at least one network protocol data unit;
   processing the at least one network protocol data unit based on a storage services protocol set to facilitate transmission of the at least one network protocol data unit to the at least one data storage unit, wherein the processing is performed at a switch located in the computer network;
   extracting the storage services protocol transaction from the at least one network protocol data unit; and
   operating upon the storage services protocol transaction.

2. The method of claim 1 wherein said processing step includes the further step of balancing loads associated with selected read transactions.

3. The method of claim 1 wherein said processing step includes the further step of duplicating data units associated with selected write transactions to achieve mirroring.

4. The method of claim 1 wherein said processing step includes the further step of duplicating data units associated with selected transactions to achieve N-way mirroring.

5. The method of claim 1 wherein said processing step includes the further step of ensuring right to access based on originator.

6. The method of claim 1 wherein said processing step includes the further step of blocking access to selected destinations.

7. The method of claim 1 wherein said processing step includes the further step of monitoring and logging access.

8. The method of claim 7 wherein said processing step includes the further step of employing results from access monitoring and logging to detect unauthorized intrusion.

9. Apparatus that facilitates operations related to data storage between a first device and at least one data storage unit in a computer network, comprising:
   a file system that indicates location of data stored on at least one data storage unit;
   circuitry that duplicates selected metadata from the at least one data storage unit to the first device, wherein the selected metadata describes the location of the data stored on the at least one data storage unit;
   circuitry that processes at least one network protocol data unit associated with the operations based on storage services protocol set information to facilitate transmission of the network protocol data unit to the at least one data storage unit, wherein said processing of the network protocol data unit includes encapsulating a storage services protocol transaction into a payload portion of each of the network protocol data unit, wherein the storage services protocol transaction is to access the data stored on the data storage unit and described by the selected metadata, and wherein the storage services protocol transaction is generated in response to the selected metadata duplicated to the first device.

10. The apparatus of claim 9 wherein said circuitry balances loads associated with selected read transactions.

11. The apparatus of claim 9 wherein said circuitry duplicates data units associated with selected write transactions to achieve mirroring.

12. The apparatus of claim 9 wherein said circuitry duplicates data units associated with selected transactions to achieve N-way mirroring.

13. The apparatus of claim 9 wherein said circuitry facilitates ensuring right to access based on originator.

14. The apparatus of claim 9 wherein said circuitry blocks access to selected destinations.

15. The apparatus of claim 9 wherein said circuitry monitors and logs access.

16. The apparatus of claim 15 wherein said circuitry employs results from access monitoring and logging to detect unauthorized intrusion.

* * * * *